US005387870A

United States Patent [19]

Knapp et al.

[11] Patent Number: 5,387,870

[45] Date of Patent: Feb. 7, 1995

[54] METHOD AND APPARATUS FOR FEATURE EXTRACTION FROM INTERNAL COMBUSTION ENGINE IGNITION WAVEFORMS

[75] Inventors: Benjamin P. Knapp, Byron Center; Robert Trenary, Mendon; James T. Walters, Kalamazoo; Clarence B. Allgor, Paw Paw; David T. Bach, Kalamazoo, all of Mich.

[73] Assignee: SPX Corp., Muskegon, Mich.

[21] Appl. No.: 2,165

[22] Filed: Jan. 8, 1993

[51] Int. Cl.[6] ...................... G01M 15/00; F02P 17/00

[52] U.S. Cl. .................................... 324/379; 324/378; 73/117.3; 364/431.04

[58] Field of Search ............... 324/116, 378, 379, 380, 324/399, 402, 384, 393, 394; 364/431.03, 431.04, 431.01, 431.12, 537.02, 551.01; 73/117.2, 117.3, 116, 118.1; 123/630

[56] References Cited

U.S. PATENT DOCUMENTS

| | | | |
|---|---|---|---|
| 4,123,674 | 10/1978 | Comiskey et al. | 324/379 |
| 4,291,383 | 9/1981 | Tedeschi et al. | 364/551 |
| 4,373,186 | 2/1983 | Marshall et al. | 364/551 |
| 4,394,742 | 7/1983 | Grummer et al. | 364/487 |
| 4,418,388 | 10/1983 | Allgor et al. | 364/431.01 |
| 4,502,324 | 3/1985 | Marino et al. | 73/117.3 |
| 4,795,979 | 1/1989 | Kreft et al. | 324/379 |
| 4,812,979 | 3/1989 | Hermann et al. | 364/431.01 |
| 5,063,515 | 11/1991 | Kunst et al. | 364/431.01 |
| 5,250,935 | 10/1993 | Jonker et al. | 364/431.04 |

OTHER PUBLICATIONS

Description of Applicants' On-Sale product Allen Test Products, at least one year prior to Jan. 1993, p. 1.

*Primary Examiner*—Kenneth A. Wieder
*Assistant Examiner*—Jay M. Patidar
*Attorney, Agent, or Firm*—Clifford Kraft

[57] ABSTRACT

The invention is a method and apparatus for extracting and analyzing features in real time from primary or secondary ignition waveforms, including engine probes, sampling device, and a processor that extracts from the waveform features such as peak firing height, firing line duration, firing line slope, firing line noise, post firing line duration, primary oscillations, and dwell interval duration and compares them against fixed thresholds and running averages to detect anomalies. Anomalies are reported as they occur allowing diagnosis of transient events as well as steady conditions. Waveforms with or without anomalies may be stored and retrieved as needed.

16 Claims, 6 Drawing Sheets

METHOD AND APPARATUS FOR FEATURE EXTRACTION FROM INTERNAL COMBUSTION ENGINE IGNITION WAVEFORMS

BACKGROUND

1. Field of the Invention

This invention relates generally to the field of automotive diagnostics, especially internal combustion engine diagnostics, and more particularly to the problem of automatic, real time engine waveform feature extraction for exact trouble pinpointing.

2. Description of the Related Art

Engine analyzer systems typically consist of signal pickup probes, a processor, and an oscilloscope display that can be synchronized to the engine RPM. In particular, waveform analyzers may contain capacitive or magnetic pickups on spark plug wires and direct or probe connections to primary conductors, as well as probes to sources of fuel injector signals, alternator signals, oxygen sensors, and other possible sensors. These probes respond to the electrical signals that control the functioning of the engine. The electrical output signals from the probes are usually amplified and conditioned for display on an oscilloscope screen. Modem analyzers may also sample and convert the signals to digital form before display. A processor may manipulate the signals so that the digital display shows a reconstructed simulation rather than the actual analog waveform that occurred during a cylinder firing cycle.

The purpose of analyzing engine signals is to diagnose malfunctions and aid in tuneup and adjustment of engine control systems and devices. Engine signals, when properly interpreted and analyzed, can point to a myriad of possible problems. Analysis generally proceeds in one of two ways. The waveforms are either displayed on an oscilloscope where a trained human operator interprets their condition and searches visually for anomalies, or they are stored in a memory and later processed off line (not in real time). In either case, post processing and interpreting waveforms and examining features is very slow. For the case of an oscilloscope display, the waveform is overwritten numerous times while the operator examines it. It is possible to miss transient problems because an operator is really observing the average of many engine or cylinder cycles. For the case of off-line processing, a series of engine cycles is stored. Some are analyzed, while others are ignored. Transient conditions present in unstored or ignored waveforms are missed.

There is a need for a method and apparatus to extract and analyze features from engine signals in real time. Such a system must be able to examine every engine cycle and every cylinder period completely before another occurs. A plurality of waveform parameters must be extracted and analyzed for anomalies, both against fixed thresholds and against running averages. Important features should be stored, and anomalies must be reported in real time. In addition, real time waveforms should be marked indicating that an abnormality has been detected and what that abnormality was. The waveform can be later reconstructed and displayed with the anomaly clearly marked. The system should be able to analyze both primary and secondary ignition waveforms as well as other engine waveforms. In particular, the analysis of ignition waveforms should include different characteristic parts of the ignition waveform such as firing peak, firing line, oscillations, and dwell. The system must not miss targeted transient conditions.

SUMMARY

The present invention is a method and apparatus for extracting features from an engine ignition waveform in real time for engine diagnosis. The method comprises sampling the waveform at a first sampling rate, selecting one from N samples based on a parameter, where N is an integer, forming an input sample sequence at a second rate from the selected samples, searching this sequence for firing peak, firing line, post firing line, and dwell interval, comparing firing peak height, firing line noise, primary oscillations, post firing line interval, and dwell interval against fixed thresholds and running averages to detect an anomalous firing event, and reporting anomalous firing events.

The apparatus comprises an engine probe means responsive to primary and secondary engine ignition signals, a sampling means for sampling the output of the engine probe, a processor means for determining in real time, times corresponding to positions along an ignition waveform corresponding to one or more of: firing time, end of firing line, beginning of dwell interval, or next firing time, determining in real time values corresponding to firing peak height, firing line duration, firing line slope, post-firing interval duration, number of oscillations, and dwell interval duration, comparing determined values against fixed thresholds and running averages to determine cylinder anomalies, and reporting cylinder anomalies.

The first step in the method is to search the input sample sequence for a firing peak or point where a spark plug fires. When such a peak is located, its height is determined, and compared against fixed thresholds and a running average to detect a possibly anomalous firing event. An anomalous firing event can indicate a fouled spark plug, a high resistance path in the ignition secondary, wrong fuel/air mixture, or one of numerous other possible problems.

For the analysis of a secondary ignition waveform, the flat voltage region known as the firing line is next examined. This region occurs immediately after the firing peak and represents the time when fuel is burning in a cylinder. The duration and slope of the firing line are determined and examined. The duration represents the time of the fuel burn. The slope indicates the condition of combustion within the cylinder.

For the analysis of a primary waveform, the firing line and post-firing line regions contain two different types of oscillations. The first set of oscillations occurs when the points or the electronic ignition transistor opens and energy transfers between the coil and external capacitor. The second set of oscillations occurs after the firing line and represents the beginning of the interval between the time when the fuel bum extinguishes and that when the points or electronic ignition close to again allow primary current. The number of oscillations in these two intervals is counted and can be used to point to various engine related problems such as a bad coil or capacitor.

The post-firing line interval ends when the points or electronic ignition close. This begins the dwell interval where current flows in the coil primary, and energy is stored in the the coil's magnetic field. The duration of the dwell interval is measured and its length determines the condition of the points or electronic ignition system.

In addition to feature extraction, the present invention allows random access, real time storage of any automotive related waveform, including those triggered by discovered anomalies and any others chosen by an operator. Numerous such waveforms from the same or different cylinders can be stored. This permits a post-processor or engine analyzer to retrieve them and present them to a CRT display along with marks directing an operator's attention to any anomalies reported in real time. The present invention also allows good waveforms to be stored so that they can be visually or automatically compared with those that contain anomalies. No targeted transient conditions are missed because the processing and diagnosis proceed in real time. It is not necessary to store useless waveform data in order to search for a possible anomaly. This permits storage of only meaningful data. However, the present invention does not require storage of waveforms for its operation. It can diagnose failures without storing any data for retrieval. It does not suffer from the problem of missing targeted transient conditions while stored waveform records are being analyzed.

The present invention provides a method and apparatus for acquiring and analyzing a set of features in real time from the primary or secondary ignition waveform of each cylinder. The actual features may differ depending upon the type of waveform being analyzed. Summary totals such as running averages are maintained over several consecutive engine periods. Individual waveform parameters are compared and evaluated against these summary totals or against fixed norms or thresholds. The analysis is performed in real time so that no targeted transient failure event or anomaly is missed at any engine speed. This is done without the use of excessive memory or storage facilities or unusually fast processing capability.

BRIEF DESCRIPTION OF THE DRAWINGS

For a more complete understanding of the present invention, reference should now be made to the embodiments illustrated in greater detail in the accompanying drawings and described below by way of examples of the invention.

It should be understood that the present invention is not necessarily limited to the particular embodiments illustrated herein.

DESCRIPTION AND PREFERRED EMBODIMENT

Figure 1:
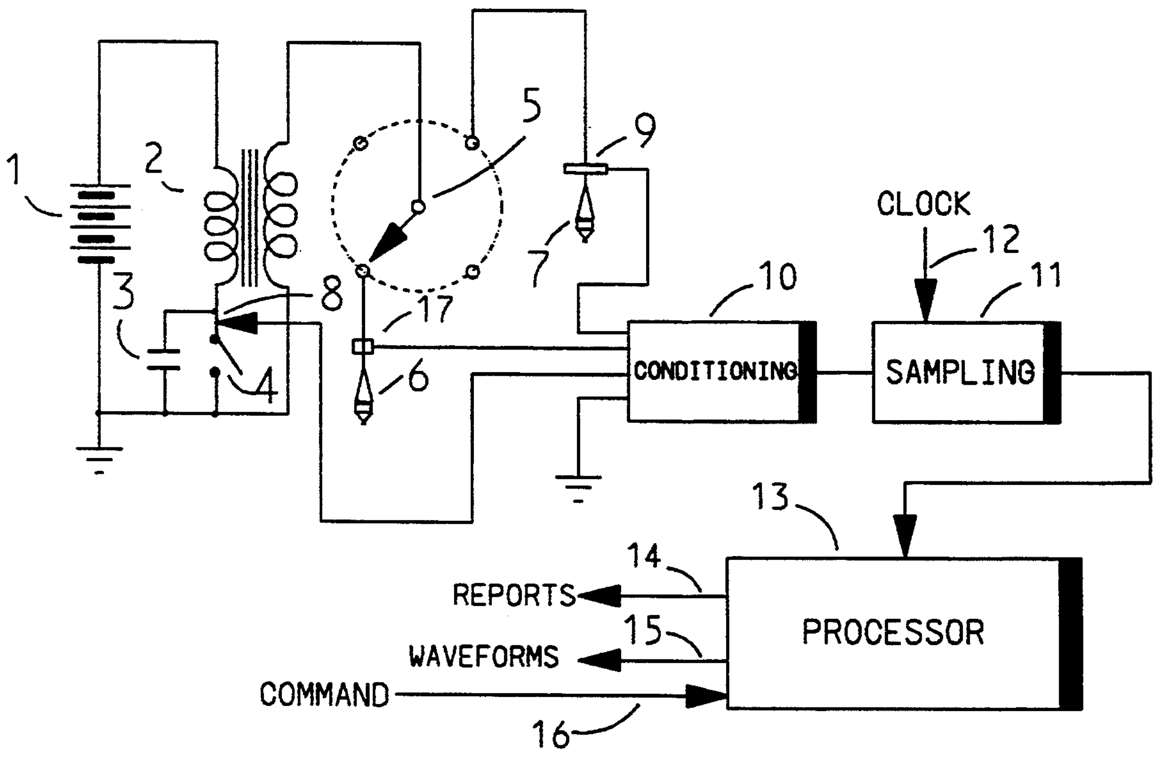
FIG. 1 is block diagram of the overall operation of the present invention.

FIG. 1 shows the overall operation of the present invention. It depicts a distributor ignition arrangement. This is for illustration only; the operation of the invention is not limited to this type of ignition, but works with all types. The ignition system of a typical engine derives power from a battery 1 that supplies current through a coil 2 or set of coils in the case of automobiles with distributorless ignition systems. This flow of current is controlled by a set of points 4 or transistors in the case of an electronic ignition system. The points or transistors are bypassed by a fixed capacitor 3 that prevents arcing. The coil 2 or coils have a secondary winding capable of producing high voltages. This secondary voltage may be routed to a mechanical or electronic distributor 5 for distribution to spark plugs. In the case of a distributorless system, the coil voltages are routed directly to the spark plugs. Each cylinder has a spark plug 6 that ignites the fuel/air mixture at the proper firing time. The primary side of the coil 2 is monitored with a pickup probe 8 that is responsive to the voltage present. It is possible that the primary connection may be direct on some engine types.

Each spark plug firing is also monitored with a pickup probe 17 that is sensitive to the high voltage being applied to that cylinder. These probes are usually capacitive in nature. One of the cylinders is designated as the number one cylinder 7. The cylinder designated number one is usually equipped with an additional pickup 9 that may be magnetic or capacitive. This timing pickup probe may be located at the actual spark plug lead, or it may be a magnetic probe located near the flywheel or other point where timing information can be derived. Timing may be supplied directly from an electronic control system on engines so equipped.

The electrical signals from the probes 17 on the various secondary spark plug leads and probes 8 on the primary, as well as information from other signal sources such as a fuel injection system or alternator and the number one cylinder timing information, enter a signal conditioning circuit 10 that converts the various probe voltages to levels suitable for sampling and data acquisition. The nature of this signal conditioning apparatus is well known in the art of automotive engine analyzers as an engine analyzer analog section and will not be discussed further (see U.S. Pat. No. 4,125,894, FIGS. 3–5).

The conditioned signal from the signal conditioning circuit 10 is coupled into a digital sampling circuit 11. This circuit samples the incoming voltage waveform at a predetermined rate determined by a sampling or conversion clock 12. The digital sampling circuit 11 may simply be an analog to digital (A/D) converter well known in the art, or it may be more complex. The digital sampling circuit 11 samples the incoming analog waveform at a rate of about 2.5 MHz in order to capture the details of the spark firing peak. Other sampling rates are possible. In order to faithfully analyze or reproduce an analog signal with digital sampling, it must be sampled at a rate of at least twice the highest frequency it contains. Because the firing peak in a secondary ignition signal lasts for only a few microseconds, it is necessary to sample at a high rate to capture the exact peak value. A slower sampling rate, while sufficient for the rest of the waveform, may miss the exact time of the firing peak, and hence its exact height or voltage value.

The present invention can use a high sampling rate for the firing peak, and hold one out of every N samples, where N is an integer, based on a parameter such as largest positive or negative value or largest absolute value. This leads to an effective down-conversion of the sampling rate by a factor of 1/N. The stream of chosen samples thus has a data rate of 1/N times the original rate. N can range from two to over one hundred depending on the speed of processing and the original sampling rate. A processor means similar to the 80188 microprocessor manufactured by Intel Corporation can operate at an effective clock rate of over 20 MHz. With this type of processor means, N can be chosen to be around fifty.

The stream of sampled signals, possibly down-converted, is routed to a feature extraction processor circuit 13 that consists of a signal processor means for extracting and analyzing waveform features, and a communication means for communicating with the rest of an engine analyzer or with a digital oscilloscope, and may contain an elastic store. This circuit extracts features from the sampled waveform during the real time interval of each cylinder firing, determines anomalies, and reports them via a communications link 14, as well communicating stored waveforms 15 to an engine analyzer or control system. The feature extraction processor 13 is controlled and commanded via a communications 16 from an engine analyzer or system controller.

Figure 2:
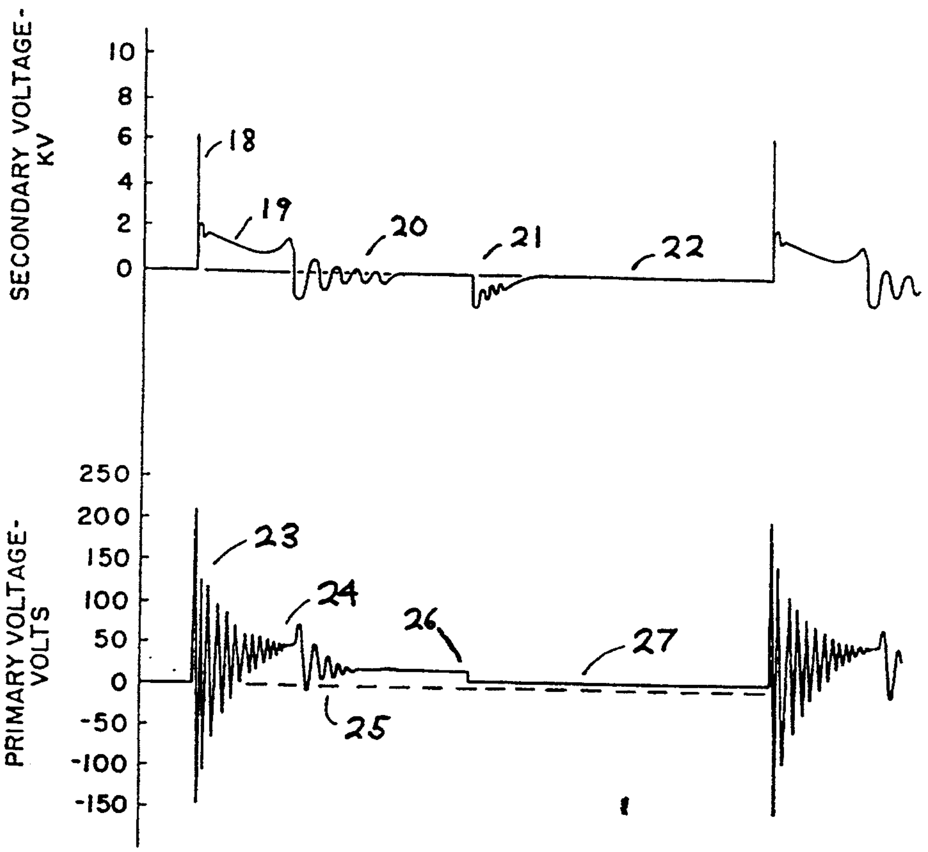
FIG. 2 is a depiction of the form of a secondary and primary engine ignition waveform.

A typical secondary and primary ignition waveform is depicted in FIG. 2. The secondary waveform (upper trace) is characterized by a high voltage firing peak 18. This is the time when the points open and the magnetic energy stored in the coil is converted to a high voltage that appears across the spark plug. During the fuel bum period, the secondary waveform contains a relatively flat pedestal of several kilovolts called the firing line 19. When the fuel in the cylinder is burned up, the spark extinguishes, and the secondary waveform enters the post-firing line interval 20. Here there may be oscillations as the remaining energy damps across the coil resistance. At a particular time in the cycle 21, the points close, and the dwell interval 22 begins. During this interval, current flows in the coil primary, and energy is again stored in the magnetic field for the next firing event.

The primary waveform (lower trace) has a similar set of distinct parts or intervals; however, it is characterized by lower voltages and considerably more ringing or oscillation. The firing peak 23 occurs when the points open and is followed by considerable oscillation on the firing line as energy is exchanged between the coil primary and the capacitance in the system. There may be a flat region 24 at the end of the firing line. After the fuel burn is complete, the post-firing line interval 25 is characterized by oscillations of a lower frequency as the system again exchanges energy between the coil and capacitor. When the points close, the primary waveform exhibits a negative going step 26 that signals the beginning of the dwell interval 27; the dwell interval lasts until the next firing event.

Figure 3:
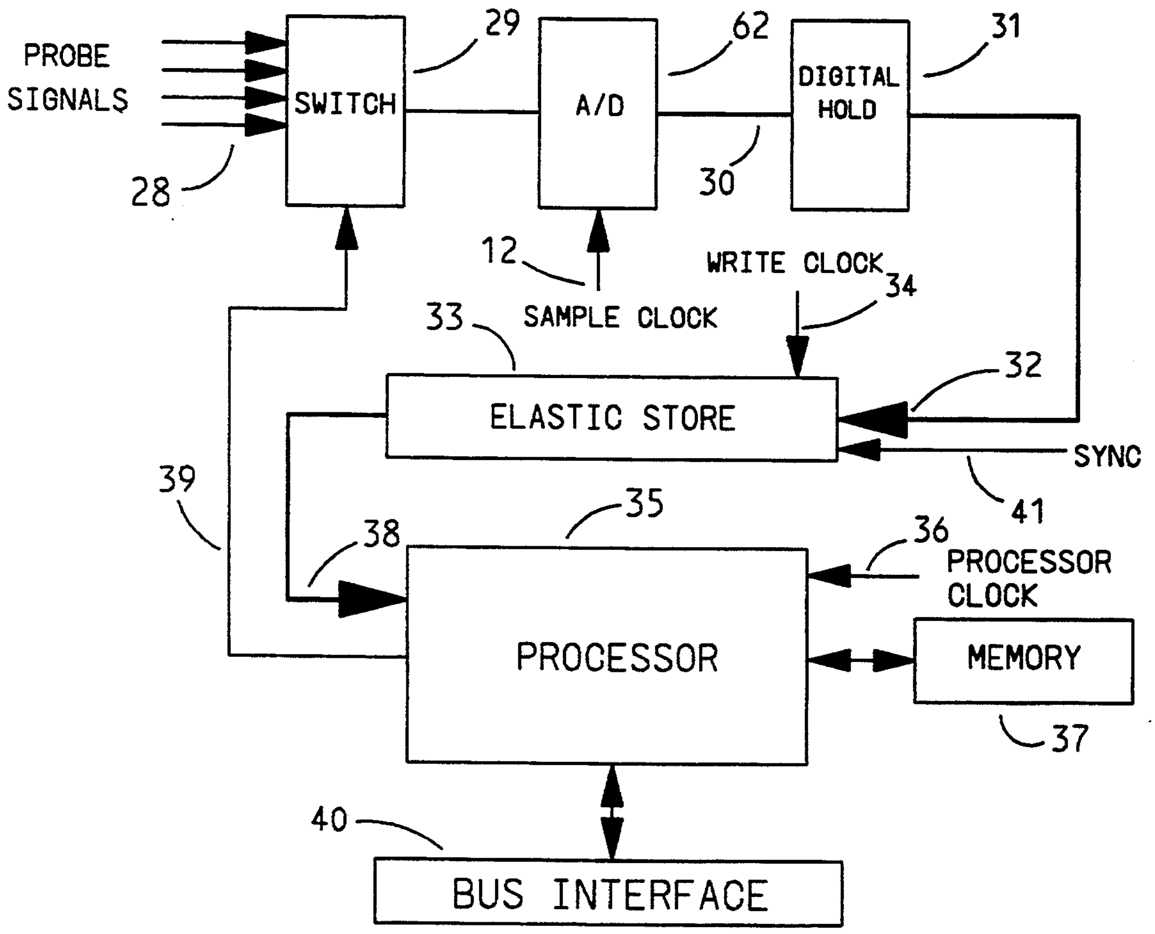
FIG. 3 is a block diagram of a method of constructing a feature extraction processor using a microprocessor and an elastic store.

FIG. 3 shows the digital sampling and feature extraction circuits in block form. Conditioned signals 28 are routed from the analog signal conditioning circuits previously mentioned to an analog switch or multiplexer 29. A single signal is selected for feature extraction analysis and routed to an A/D converter 62 where it is sampled at about 2.5 MHz from a sampling clock 12. Eight bit digital samples 30 are conveyed to a digital hold circuit 31 that keeps one sample out of every N samples, where N is a positive integer. The one sample is chosen based on a parameter such as largest positive or negative value or largest absolute value. This chosen value 32 may be stored in a nine bit wide elastic store 33 which can be a first-in first-out (FIFO) register or a random access memory (RAM) or any other type of elastic storage means. Data are stored in the elastic store 33 at a rate of 1/N times the original sampling rate. Preferably, the rate is near 50 kHz which is around 1/50 the frequency of the sampling clock. Storage in the elastic store is controlled by a storage clock 34 running at the correct rate.

A synchronization signal 41 is generated either directly from an auxiliary secondary ignition probe on the number one cylinder (not shown) or synthetically on distributorless ignitions as is well known in the art. This signal 41 is digitally coded and combined as the ninth bit in the elastic store 33.

In the circuit shown in FIG. 3, the feature extraction system is controlled by a processor means that can be a 80188 microprocessor 35 of the type manufactured by Intel Corporation. Any other comparable microprocessor could be used for this operation as well as many types of digital signal processors (DSP). The entire operation could also be controlled by hard-wired digital logic circuits from logic families such as TFL, CMOS or other logic families, or it could be constructed from programmable logic devices such as PAL's, PLD's or gate arrays. The entire circuit also could be made from a custom silicon device such as an ASIC.

The processor means executes a stored program from memory 37, and the same memory is used for scratch and for temporary waveform storage. This is not essential to the functioning of the present invention. The program memory could be a read-only memory (ROM).

The processor means 35 communicates with an engine analyzer system or controller over an Industry Standard Architecture (ISA), or Extended Industry Standard Architecture (EISA) bus (see Intel ISA Bus Specification and Application Notes, Rev. 2.01, September 1989, Intel Corporation). This communication could also be serial using American National Standards Institute (ANSI) RS-232 or RS-422, or similar methods, or it could be through other parallel buses such as Future Bus or similar bus. The communication can take place through cables, local area networks or light fibers.

Communication through the ISA/EISA bus interface 40 consists of commands and information from an engine analyzer or external controller concerning which type of signal should be analyzed, which features should be extracted, and which types of anomalies should be reported. The communication to the engine analyzer or controller consists of anomaly reports that identify features of a given cylinder firing cycle that deviated from fixed thresholds or running averages. Stored waveforms that may or may not contain anomalies can also be transferred. Waveforms are stored and retrieved upon request of the analyzer or automatically when anomalies are detected. The processor also selects which analog signal to analyze based on communication over the EISA bus, and sends commands 39 to the analog switch 28 to select the desired channel of incoming data.

The processor shown in FIG. 3 is clocked at approximately 40 MHz from a system clock 36. Internally this is divided to produce approximately a 20 MHz effective clock rate. This clock rate is not essential to the functioning of the present invention and could vary over a wide range depending on the type of processor means used.

If an elastic store is used, the processor means reads data from the elastic store 33 over a nine bit data bus 38 at approximately 50 kHz. The elastic store 33 may be used as a temporary buffer to hold data. This is useful since data exits the digital hold circuit 32 at a constant rate, but the processor may need data at a variable rate during feature extraction. An elastic store 33 allows a fixed input data rate and a variable output data rate. The processor must read data fast enough to prevent the elastic store from overflowing. The processor synchronizes its reads to the elastic store on a cylinder cycle basis. Direct synchronization between the elastic store write rate and the processor is possible, but not necessary. If there is no direct synchronization, a processor program can resynchronize on a new cylinder when a firing peak is detected and on number one cylinder via the ninth bit in the elastic store read data. The exact size of the elastic store is not critical to the functioning of the present invention as long as it is large enough to prevent overflow during feature processing. The invention will operate with an elastic store no longer than a single complete waveform. It will also operate without an elastic store if the processor means reads data at a constant average rate. If no elastic store is used, data reads at the processor can be controlled by processor interrupts.

Figure 4:
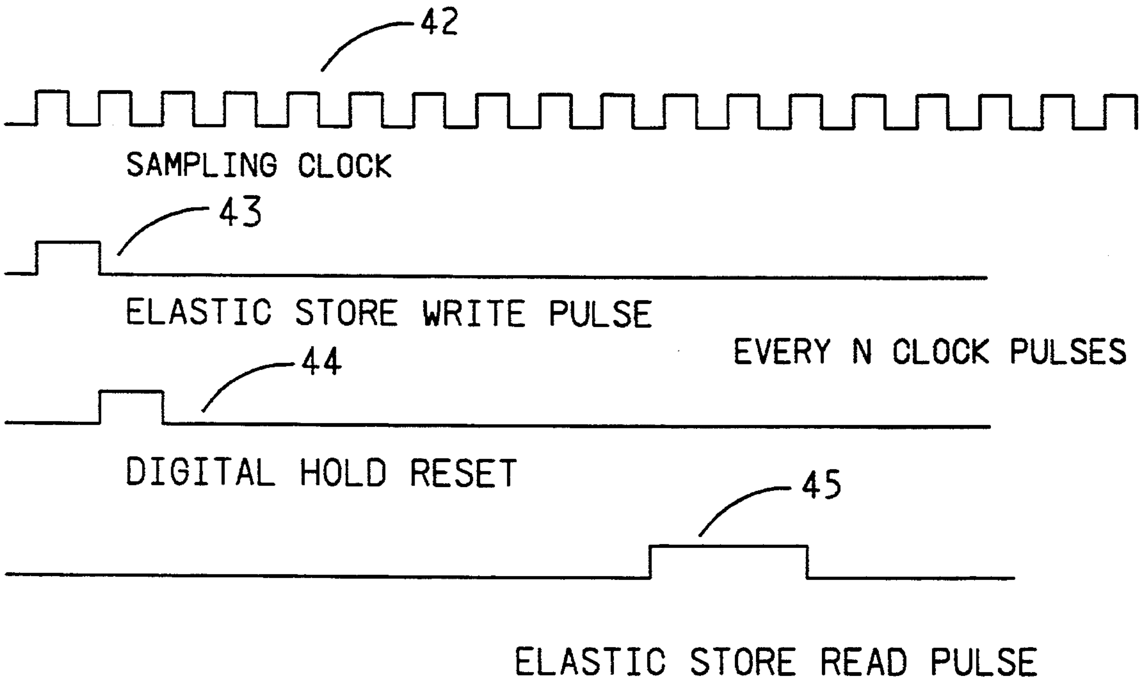
FIG. 4 is a timing diagram showing the timing relationships between the high speed sampling process and the lower speed elastic store.

The timing relationship between the higher speed sampling process and a lower speed elastic store is shown in FIG. 4. The sampling clock 42 runs at around 2.5 MHz causing the A/D converter 62 (FIG. 3) to convert the selected analog data to an eight bit sample about every 400 nanoseconds. Each eight bit data sample is routed to the digital hold 31 (FIG. 3) where the samples are held based on a parameter. Once every N samples, the lower speed elastic store clock 43 of rate 1/N causes the sample chosen by the digital hold to be stored in the elastic store. A ninth bit 41 (FIG. 3) representing engine synchronization is combined with the data stream so that the elastic store 33 (FIG. 3) stores nine bit words. The elastic store clock 43 also causes a digital hold reset signal 44 to be generated to zero the digital hold so that it can process the next N samples. The processor 35 (FIG. 3) produces an elastic store read signal 45 that reads a nine bit word from the elastic store and causes it to advance. This processor read signal 45 is not necessarily synchronized with the elastic store write clock 43, but it should occur, on the average, at least once every N samples to prevent the elastic store from overflowing.

Figure 5:
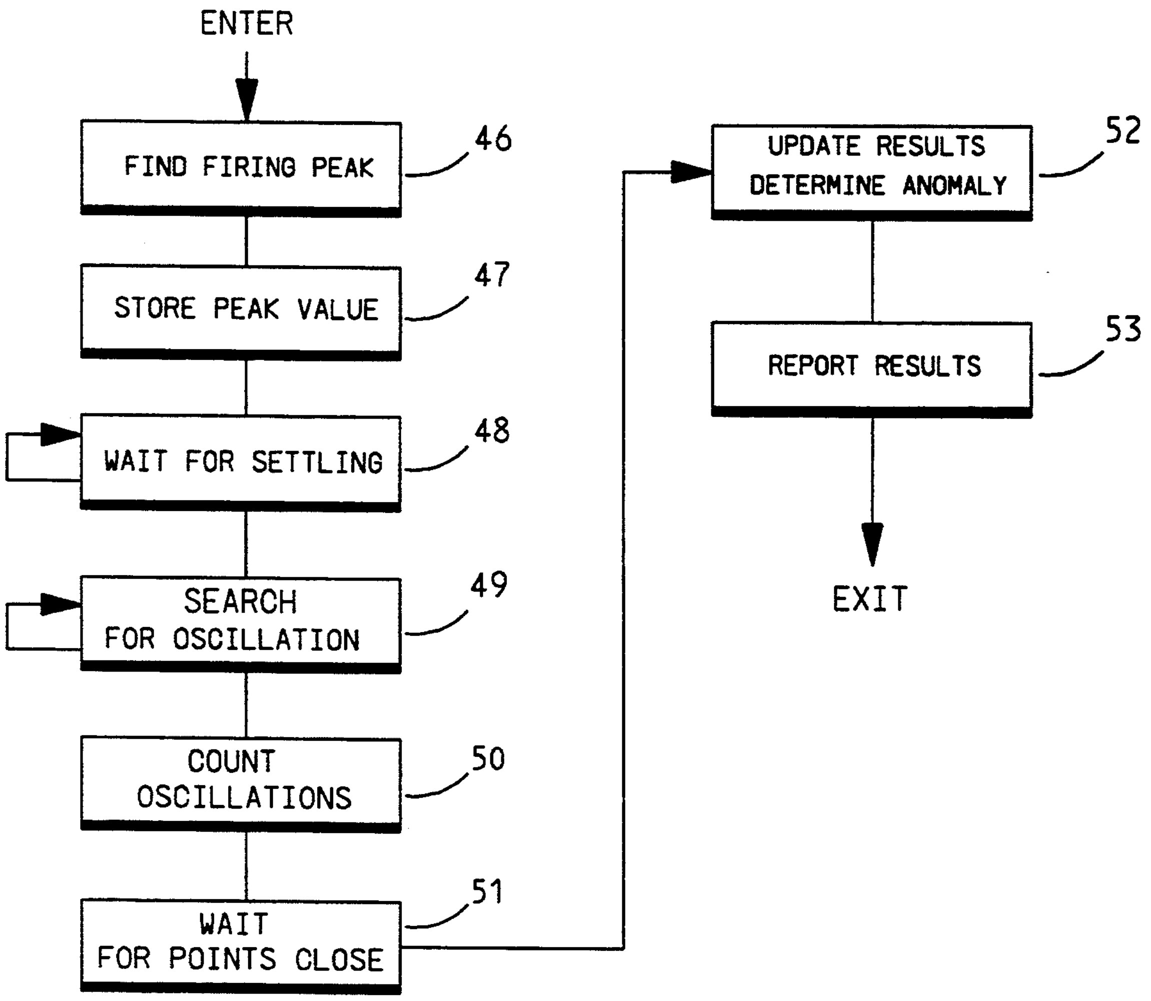
FIG. 5 is a flow chart of a processor program to extract features from a primary ignition waveform.

A processor program for extracting features from an primary ignition signal is shown in FIG. 5. This program is entered once each cylinder cycle during primary waveform analysis. The first step 46 searches for the firing peak. The firing peak is a large amplitude signal that is narrow in time and contains a much greater voltage value than any surrounding sample value. The peak value is stored 47, and time is allowed for the waveform to settle into a firing line 48. The firing line has a firing line ending time and a firing line beginning time. It begins with the end of the firing peak, and it ends with a drop in voltage from the relatively flat region of the firing line. When the firing line ends, the program must sense the beginning of oscillations 49. After that, the number of primary oscillations is counted 50. The count period continues until the program senses points closure 51. Points closure indicates the beginning of the dwell period and can be identified by a very low primary voltage. The dwell period has a dwell period beginning time and a dwell period ending time. The beginning time is when the points close, and the ending time is when the next cylinder's firing peak occurs. During the dwell period, when points are closed, the program determines if there was an anomaly 52. If an anomaly is detected, the program reports it over the EISA interface 53.

Figure 6:
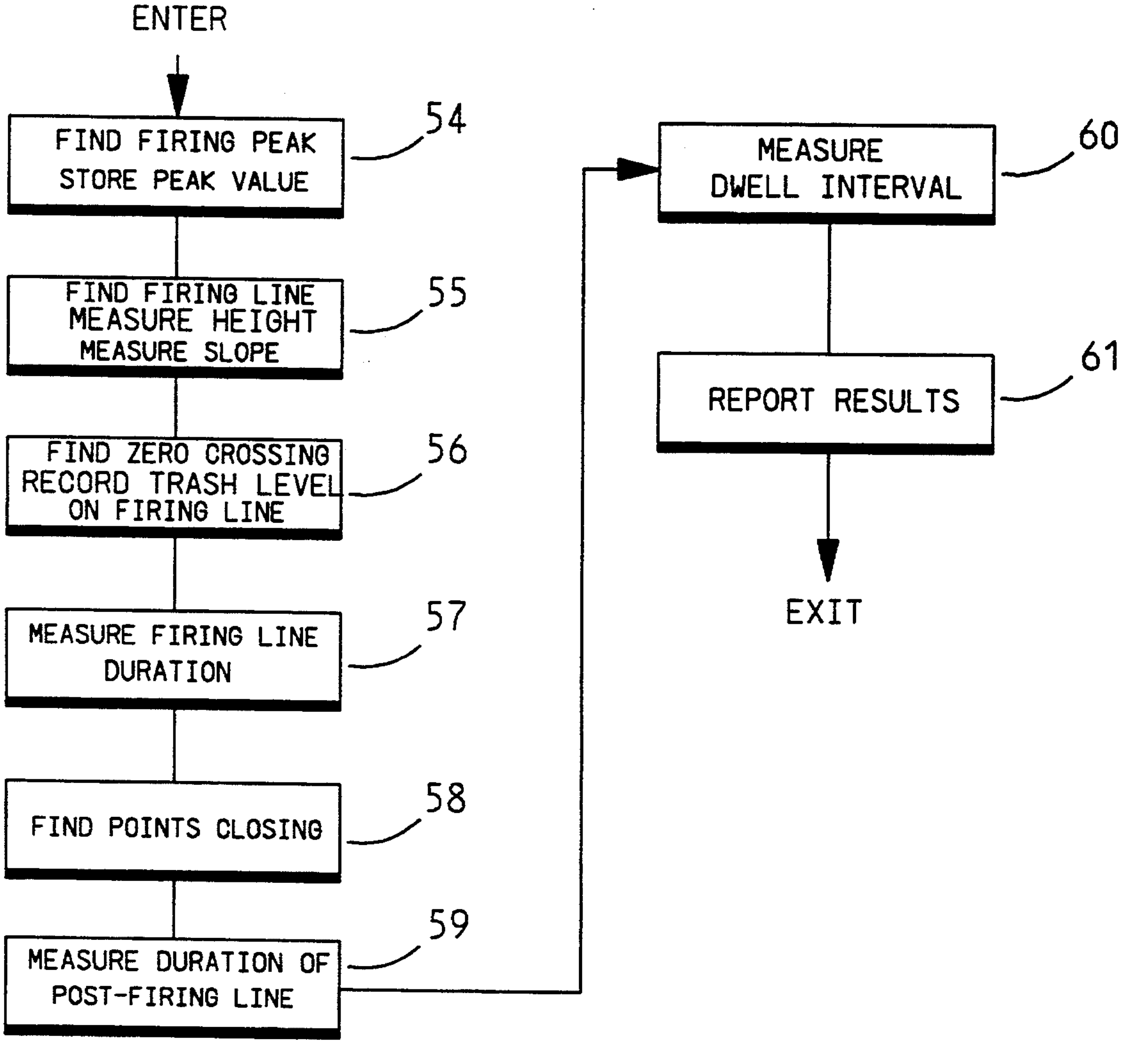
FIG. 6 is a flow chart of a processor program to extract features from a secondary ignition waveform.

A processor program for extracting features from a secondary ignition signal is shown in FIG. 6. This program is entered once each cylinder cycle during secondary waveform analysis. The first step 54 finds the height of the firing peak. The firing peak in a secondary signal is a very large kilovolt signal. The height is determined and recorded. Next, the firing line, or horizontal region after the firing peak is analyzed 55. The actual level of the firing line is determined as well as its slope and the amount of noise or "trash" present. Excess firing line noise can represent an anomaly. Next, the end of the firing line is detected 56, and the duration of the firing line is recorded 57. The duration of the firing line is computed by subtracting the firing line beginning time from the firing line ending time. The end of the firing line is detected by a sudden drop in voltage value from the relatively flat firing line region. The firing line slope is computed by dividing the voltage difference between the end and beginning of the firing line by the firing line duration.

After the firing line is examined, the program searches for the end of the post firing line interval 58 which occurs when the points close indicating the beginning of the dwell interval. At points closure, there is an additional drop in secondary voltage. The post firing line interval duration is recorded 59, and the length of the dwell interval is determined 60. The durations of the post firing line interval and the dwell interval are computed by subtracting the respective beginning times for the ending times. The dwell interval ends with the firing peak of the next cylinder. During the dwell period, the program determines if there was an anomaly, and, if so, reports it 61.

All features extracted during primary or secondary waveform analysis are compared against both fixed thresholds and running averages. Fixed thresholds exist for peak height, firing line duration, firing line slope, firing line noise or "trash", number of primary oscillations after the firing line, duration of the post firing line interval, and duration of the dwell interval. Fixed thresholds can be stored in random access memory (RAM) or can be held in separate read only memory (ROM). An advantage to storing them in RAM is that they can be changed or updated for different vehicle or engine types.

Running averages of all quantities are computed by methods well known in statistics. A possible anomaly exists when one of the extracted feature quantities exceeds its fixed threshold or when it deviates sufficiently from its running average. Running averages can be kept separately for different cylinders, and one can also be kept over all cylinders by averaging similar values over entire engine cycles. Both types of running average are useful. A running average for a single cylinder points to transient deviations of that cylinder from its own past record. A running average over all cylinders is useful to distinguish a bad cylinder from other good cylinders. Fixed thresholds arc useful to compare cylinders to standard, known good values.

It is to be understood that the above-described arrangements are merely illustrative of the application of the principles of the present invention, and that other arrangements may be devised by those skilled in the art without departing from the spirit and scope of the present invention. Also, the principles of the present invention can be applied to the analysis of waveforms other than simply primary or secondary ignition signals. These include, but are not limited to, alternator charging waveforms, manifold pressure signals, fuel injector signals, and other waveforms associated with internal combustion engines.

We claim:

1. A method of extracting features from an engine ignition waveform for diagnosis in real time comprising the steps of:

sampling the waveform at a first sampling rate to produce a first sequence of sample values;

choosing one sample value out of every N sample values from said first sequence, where N is an integer, to produce an input sequence of sampled data values, each sampled data value having a magnitude and a time of occurrence;

searching said input sequence for a firing peak with height to indicate a spark plug firing event by finding a plurality of adjacent sample values with magnitudes at least twice the magnitude of other sample values;

determining an actual firing peak height as the greatest magnitude of said adjacent sample values;

comparing the actual firing peak height to a predetermined minimum height threshold value and reporting an anomalous firing event when said actual firing peak height is less than the minimum height threshold value;

comparing the actual firing peak height to a predetermined maximum height threshold value and reporting an anomalous firing event when said actual firing peak height is greater than the maximum height threshold value; comparing the actual firing peak height against a cylinder's running average firing peak height and reporting an anomalous firing event when the actual firing peak height differs from said running average firing peak height by more than a predetermined amount; said running average firing peak height formed by adding a cylinder's current firing peak height to the sum of its previous firing peak height, said sum divided by predetermined number.

2. The method of claim 1 wherein the one sample value out of every N samples from said first sequence is a sample with maximum magnitude of said N samples.

3. The method of claim 1 further comprising:

searching said input sequence of sampled data values for a firing line beginning and a firing line end by finding a plurality of adjacent samples of approximately equal magnitude after the actual firing peak followed by a plurality of samples of smaller magnitude, the firing line beginning occurring with the first of said approximately equal adjacent samples, and the firing line end occurring with the last of said approximately equal adjacent samples;

determining an actual firing line duration by subtracting the time of occurrence of the firing line beginning from the time of occurrence of the firing line end;

determining an actual firing line slope by subtracting the magnitude of the first of said approximately equal adjacent samples from the magnitude of the last of said approximately equal adjacent samples to form a difference, and dividing said difference by the firing line duration;

comparing the actual firing line duration against predetermined maximum and minimum firing line duration thresholds, and reporting an anomalous firing line event when the firing line duration is greater than said maximum firing line duration threshold or less than said minimum firing line duration threshold;

comparing the actual firing line slope against predetermined maximum and minimum firing line slope thresholds, and reporting an anomalous firing line event when the firing line slope is greater than said maximum firing line slope threshold or less than said minimum firing line slope threshold.

4. The method of claim 3 further comprising:

searching said input sequence of sampled data values for a time of occurrence of a dwell interval start by finding at least one sample with magnitude of zero or less, said time of occurrence of the dwell interval start being the time of occurrence of said sample with magnitude of zero or less;

determining a post-firing line interval duration by subtracting the time of occurrence of the firing line end from the time of occurrence of the dwell interval start;

comparing the post-firing line interval duration against predetermined maximum and minimum post-firing line interval thresholds and reporting an anomalous post-firing line interval duration when the post-firing line interval duration is greater than said maximum post-firing line interval duration threshold or less than said minimum post-firing line interval duration threshold.

5. The method of claim 4 further comprising:

searching said input sequence of sampled data values for a next firing peak after the dwell interval start;

determining a dwell interval duration by subtracting the time of occurrence of the dwell interval start from the time of occurrence of the next firing peak;

comparing said dwell interval duration against predetermined maximum and minimum dwell interval duration thresholds, and reporting an anomalous dwell interval duration when the dwell interval is greater than said maximum dwell interval duration threshold or less than said minimum dwell interval duration threshold.

6. The method of claim 5 further comprising:

counting oscillations between the firing line end and the dwell interval start to determine an oscillation count;

comparing said oscillation count against a minimum oscillation count fixed threshold, and reporting an anomalous oscillation count when said oscillation count is less than said minimum oscillation count fixed threshold.

7. The method of claim 5 further comprising:

forming an average dwell interval duration for all cylinders by adding the actual dwell interval duration to a sum of dwell interval durations for other cylinders and dividing said sum by a number proportional to the number of cylinders;

comparing the actual dwell interval duration against said average dwell interval duration and reporting an anomalous dwell interval event when the actual dwell interval duration differs from said average dwell interval duration by more than a predetermined amount.

8. The method of claim 6 wherein a portion of the input sequence of sampled data values representing an engine ignition waveform over a cylinder period of any cylinder with a detected anomaly is stored for future reconstruction.

9. The method of claim 3 further comprising comparing the actual firing line duration against a cylinder's running average firing line duration and reporting an anomalous firing line event when the actual firing line duration differs from said running average firing line duration by more than a predetermined amount; said running average firing line duration formed by adding a cylinder's current firing line duration to the sum of its previous firing line durations, said sum divided by a predetermined number.

10. The method of claim 3 further comprising:

forming an average firing line duration for all cylinders by adding the actual firing line duration to a sum of firing line durations for other cylinders and dividing said sum by a number proportional to the number of cylinders;

comparing the actual firing line duration against said average firing line duration and reporting an anomalous firing line event when the actual firing line duration differs from said average firing line duration by more than a predetermined amount.

11. The method of claim 3 further comprising:

determining an actual firing line end height as the magnitude of the last of said approximately equal adjacent samples;

forming an average firing line end height for all cylinders by adding the current firing line end height to a sum of firing line heights for other cylinders and dividing said sum by a number proportional to the number of cylinders;

comparing the actual firing line end height against said average firing line end height and reporting an anomalous firing line event when the actual firing line end height differs from said average firing line end height by more than a predetermined amount.

12. The method of claim 1 further comprising:

forming an average firing peak height for all cylinders by adding the actual firing peak height to a sum of firing peak heights for other cylinders, and dividing said sum by a number proportional to the number of cylinders;

comparing the actual firing peak height against the average firing peak height and reporting an anomalous firing event when the actual firing peak height differs from the average firing peak height by more than a predetermined amount.

13. The method of claim 12 wherein a portion of the input sequence of sampled data values representing an engine ignition waveform over a cylinder period of any chosen cylinder is stored for future reconstruction.

14. An apparatus for extracting features from an engine ignition waveform for diagnosis in real time comprising:

engine probe means responsive to primary or secondary engine ignition signals for producing electrical signals representative of said engine ignition signals;

sampling means, with output, coupled to the engine probe means for sampling said electrical signals at predetermined times and producing a first sequence of sample values, choosing one sample value out of every N sample values from said first sequence, where N is an integer, to produce an input sequence of sampled data values, each sampled data value having a magnitude and a time of occurrence;

processor means responsive to the output of said sampling means for:

searching said input sequence for a firing peak with height to indicate a spark plug firing event by finding a plurality of adjacent sample values with magnitudes at least twice the magnitude of other sample values;

determining an actual firing peak height as the greatest magnitude of said adjacent sample values;

comparing the actual firing peak height to a predetermined minimum height threshold value and reporting an anomalous firing event when said actual firing peak height is less than the minimum height threshold value;

comparing the actual firing peak height to a predetermined maximum height threshold value and reporting an anomalous firing event when said actual firing peak height is greater than the maximum height threshold value comparing the actual firing peak height against a cylinder's running average firing peak height and reporting an anomalous firing event when the actual firing peak height differs from said running average firing peak height by more than a predetermined amount; said running average firing peak height formed by adding a cylinder's current firing peak height to the sum of its previous firing peak height, said sum divided by predetermined number;

communications means coupled to said processing means for reporting anomalous firing events.

15. The apparatus of claim 14 wherein the processing means is a microprocessor with stored program.

16. The apparatus of claim 14 wherein the engine probe means is a capacitive or magnetic pickup.

* * * * *